United States Patent
Hayama et al.

(10) Patent No.: US 6,384,922 B1
(45) Date of Patent: May 7, 2002

(54) TAPE PRINTER

(75) Inventors: Hitoshi Hayama, Suwa; Kenji Watanabe, Tokyo, both of (JP)

(73) Assignees: Seiko Epson Corporation; King Jim Co., Ltd., both of Tokyo (JP)

(*) Notice: Subject to any disclaimer, the term of this patent is extended or adjusted under 35 U.S.C. 154(b) by 1026 days.

(21) Appl. No.: 08/745,698

(22) Filed: Nov. 12, 1996

Related U.S. Application Data (63) Continuation of application No. 08/513,171, filed on Aug. 9, 1995, now abandoned.

(30) Foreign Application Priority Data

Aug. 11, 1994 (JP) .............................. 6-189651
Jun. 16, 1995 (JP) .............................. 7-150617

(51) Int. Cl.[7] .............................................. G06K 15/00
(52) U.S. Cl. ...................................... 358/1.13; 358/1.1
(58) Field of Search ................................ 395/101, 112, 395/114, 752, 753, 758, 113, 115, 116, 757, 2, 185.1; 400/109, 110, 111; 235/379, 380, 381, 449; 340/825.35, 5.9; 364/464.02, 464.04, 709.12, 709.16; 358/468, 1.1, 1.13, 1.15, 1.14, 1.16, 1.17; 714/57; 704/2, 3, 8, 7

(56) References Cited

U.S. PATENT DOCUMENTS

| | | | | |
|---|---|---|---|---|
| 4,193,119 A | * | 3/1980 | Arase et al. | 364/419.02 |
| 4,365,315 A | * | 12/1982 | Jamnik | 364/419.03 |
| 4,638,306 A | * | 1/1987 | Rollhaus et al. | 400/100 |
| 4,694,280 A | * | 9/1987 | Rollhaus et al. | 400/100 |
| 5,009,276 A | * | 4/1991 | Raikes et al. | 364/464.02 |
| 5,133,610 A | | 7/1992 | Sukigara | 395/112 |
| 5,146,067 A | * | 9/1992 | Sloan et al. | 235/381 |
| 5,146,587 A | * | 9/1992 | Francisco | 395/185.1 |

FOREIGN PATENT DOCUMENTS

| | | |
|---|---|---|
| EP | 0333612 A2 | 9/1989 |
| EP | 0473147 A2 | 3/1992 |
| EP | 0499211 A2 | 8/1992 |
| GB | 2121574 | 12/1983 |

OTHER PUBLICATIONS

Hewlett Packard; Your Guide to Setting up Your Laser Jet III Printer; Date 1990; pp. 1–3.*
Robert Cowart "Mastering Windows™ 3.1", Special Edition; Copyright 1993.*

* cited by examiner

*Primary Examiner*—Dov Popovici
(74) *Attorney, Agent, or Firm*—Hogan & Hartson, L.L.P.

(57) ABSTRACT

A tape printer for printing input data onto a printing tape medium wherein a feature is included which allows messages to be displayed in a language selected from two or more languages provided by the tape printer. A language selection process is started only under specific conditions such as at a time when the power supply is turned on for the first time. In the language selection process, a plurality of languages are displayed cyclically on the display panel of the tape printer and users can select a convenient language from the available languages. After this selection process, messages such as warnings and operations guidance are displayed using the selected language. Messages expressed in at least two languages are stored in the table of the tape printer and a message display portion of the tape printer's processing system selects an appropriate message and displays the message on a display panel.

4 Claims, 14 Drawing Sheets

Menus for selecting the language    Menus for selecting the unit of length

FIG. 6

Language number :  0 – ENGLISH
1 – FRENCH
2 – GERMAN
3 – SPANISH

FIG. 7a

| Address for the table of English messages |
|---|
| Address for the table of French messages |
| Address for the table of German messages |
| Address for the table of Spanish messages |

FIG. 7b

| E message 1 address |
| E message 2 address |
| E message 3 address |
| E message 4 address |
| ⋮ |
| E message 45 address |
| E message 45 address |
| E message 46 address |
| ⋮ |
| E message 107 address |
| F message 1 address |
| ⋮ |
| F message 86 address |
| F message 87 address |
| F message 89 address |
| ⋮ |
| F message 107 address |
| G message 1 address |
| ⋮ |
| G message 107 address |
| S message 1 address |
| ⋮ |
| S message 107 address |

Table for English message

Table for French message

Table for German message

Table for Spanish message

| ENGLISH | FRENCH | GERMAN | SPANISH |
|---|---|---|---|
| Please Close The Cover ! | Fermer le couvercle ! | Abdeckung schließen ! | Cierre la tapa |
| Memory Full ! | Mém. pleine ! | Speich. voll ! | Memo. llena |
| Feeding ! | Chargement ! | Einzug ! | Alimentación |
| No Tape Cartridge | Absence de cass. | Keine Farb-kassette | Sin cartucho de cinta |
| No ROM Pack | Absence de ROM | Kein ROM-Modul | Sin paquete ROM |
| Insert Wider Tape | Insérer cass plus large | Breit. Band einsetzen | Insert. cinta más ancha |
| Increase Length | Augmenter la longueur | Länge vergrößern | Aumente longitud |
| BAT. Weak ! | Pile faible ! | Bat. schwach ! | Pilas débil. |
| No. Lines Free | Pas de lgns supplém. | Keine Zeilen frei | No. Lineas libres |
| Label too Long | Étiquette trop longue | Etikett zu lang | Etiqueta muy larga |
| Reset All ? Yes/No | Réinit. tot ? Qui/Non | A.Rücksetz ? J / N | Reponer todo Si/No |
| Tape XLength | Type X Long. | Band X Länge | CintaXLong. |
| File Store | Fichier Mémoire | Datei Speich. | Fichero Almacen. |
| File Recall | Fichier Rappel | Datei Laden | Fichero Recuper. |
| File Delete | Fichier Effacer | Datei Löschen | Fichero Borrar |
| Store | Mémoire | Speich. | Almacen. |
| Stored | En mémo. | Speich. | Almacen. |

TAPE PRINTER

This is a continuation of U.S. patent application Ser. No. 08/513,171, filed Aug. 9, 1995 entitled "TAPE PRINTER" abn.

BACKGROUND OF THE INVENTION

1. Field of the Invention

This invention relates to a tape printer for printing data containing a desired character string as well as other characters onto a tape medium and, more particularly, to a tape printer which can display the status of various aspects of the tape printer's operation.

2. Description

Tape printers have been marketed which can print a desired string of characters and other symbols onto a tape medium. As is publicly disclosed in Japanese patent document Nos. Hei 4-163080 and Hei 5-28247, some tape printers can facilitate operation by displaying the current status of various printer functions. Since most available tape printers incorporate both data input and printing functions in a small body and can be operated easily, they are used widely in Japan and in several other countries. The fonts and other symbols used for printing are common to many tape printers. However, the displayed messages which indicate printer status and operations guidance are different in each country. Since different display contents are required for markets in which different languages are spoken, the number of different kinds of tape printers which must be developed and manufactured corresponds at least to the total number of languages spoken in the markets in which such tape printers will be sold.

Recently, usage of these tape printers has increased dramatically and there is, therefore, an increasing demand for tape printers which provide useful messages on a display screen in languages which are convenient. These messages facilitate the operation of the tape printer and provide information regarding system status in order to improve usability. However, the currently available tape printers are designed for a particular linguistic area and this requires significant involvement in each process of manufacturing, distribution and sales, with such additional work driving up the price of the tape printers. Users prefer to purchase tape printers which employ a convenient language, however, a tape printer which employs the desired language may not be easy to obtain, due to complicating factors such as high price or slow delivery time.

It is therefore an object of the present invention to provide a tape printer which supplies useful system messages in which a pleasant and convenient environment for each user can be created easily according to the particular requirements of the user. Another object of the present invention is to provide a tape printer which can be manufactured and supplied at a lower cost.

SUMMARY OF THE INVENTION

In the tape printer provided according to the teachings of the present invention, a feature is included which provides for the display of messages in two or more languages. Therefore, users can select a convenient language from among the languages provided in the tape printer so that they can easily comprehend displayed messages. The tape printer of the present invention prints input data on a tape printing medium and comprises input means for entering the data to be printed, display means for displaying the data entered by the input means, memory means for storing the data and the system status of the tape printer; operations guide display means for displaying warnings, system status, and unauthorized operation indicators; and language selection means for selecting a language to be used for displaying the information to be displayed by the display means. According to the tape printer provided for in the present invention, the manufacturer needs only to develop, manufacture and sell one kind of tape printer to handle several different languages, and can thereby save the time and money necessary to develop machines for each individual language. The present invention is also of significant benefit to the users, who are able to operate the tape printer by reading the messages as expressed in a user-specified convenient language. Furthermore, these printing units can provide a machine capable of displaying messages in languages which may not be common to the particular area in which the tape printer is sold.

In order to provide the tape printer which can easily change the language used for expressing the system messages, it is preferable to install in the tape printer a storage table in which of a plurality of messages expressed in two or more languages can be stored and addressed and a means for selecting a desired message from the table based on numbers allocated to the respective language and desired message. The message displayed may be selected using address tables which store the addresses of the language tables and the corresponding messages to be displayed. During a process which selects a message to be displayed, the message address is calculated using the number allocated to the individual language, and then the address of the individual message is calculated and the appropriate message is selected. In the tape printer described above, the language selection means is provided to select the desired language, and messages expressed in that language may then be displayed on the tape printer The language selection means is activated under various conditions such as the operation of a key in the input section specifically used for starting the selection process, a combined operation of a power supply key with another key or keys of the input means, or at the time when the power supply is initially turned on. In addition, the language selection means may have functions for changing various other items which might be different in different countries or their regions. For instance, the tape printer of the present invention can allow the user to select the units in which lengths and weights are expressed.

DESCRIPTION OF THE PREFERRED EMBODIMENT

The preferred embodiment of this invention will now be described to further explain and clarify with greater detail the composition and operation of this invention.

Figure 1:
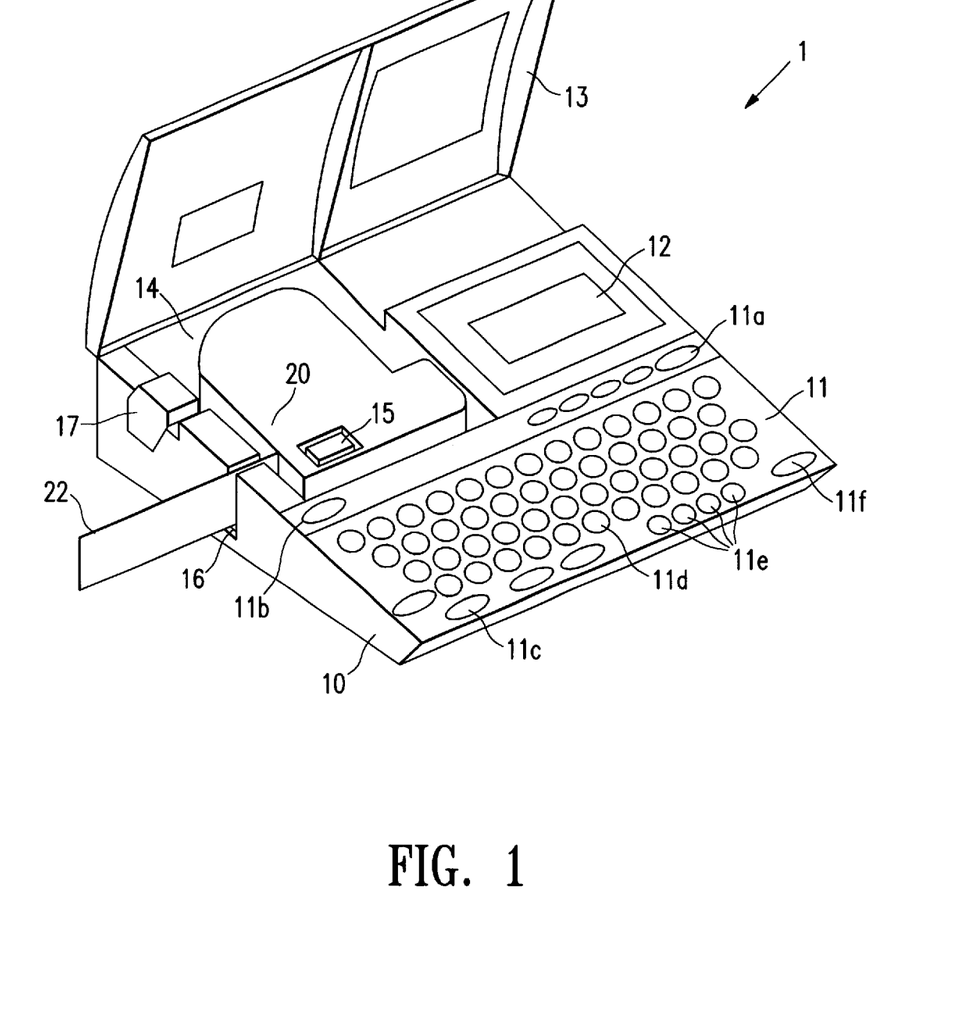
FIG. 1 is an external view of a tape printer of an embodiment of the present invention.

FIG. 1 illustrates an external view of tape printer 1 in accordance with one embodiment of the present invention. The tape printer 1 of this embodiment has a main body 10 containing various parts therein, a keyboard 11 which includes 63 input keys, a liquid crystal panel 12 (hereinafter referred to as the LCD panel), and a main body cover 13 which opens and closes freely. On the LCD panel 12, input data, data to be printed, and other character strings showing information such as various system status and other information relating to the tape printer 1 are displayed. On the LCD panel 12, warnings, operations guidance and other information necessary for the operation of the tape printer are also displayed A tape cartridge storage section 14, which is located in the upper part of the left of the main body, has a structure in which an ink ribbon (not shown) and a tape cartridge 20 including printing tape 22 to be printed by the ink ribbon can be accommodated.

To use the tape printer 1, the main body cover 13 is first opened as illustrated in FIG. 1. After opening the body cover, the tape cartridge 20 is put in the tape cartridge storage section 14. The printing tape 22 is disposed so that its end extends out of the main body case 10 through a tape outlet 16, and then the main body cover 13 is closed. The power supply is then turned on by operating a power supply key 11a. After the tape printer has been powered up, users may operate the keyboard 11 to enter the characters and the desired print attributes of the character strings to be printed. Operation of the print key 11b initiates the printing process of the tape printer and the input characters are printed on the printing tape 22, which is supplied from the tape cartridge 20. The printed tape 22 is then fed from the tape outlet 16 situated at the left of the main body case 10. The printed tape 22 is then cut with a cutter, which is not shown in the figure but which is installed near the tape outlet 16, by depressing a cutter button 17.

Figure 2:
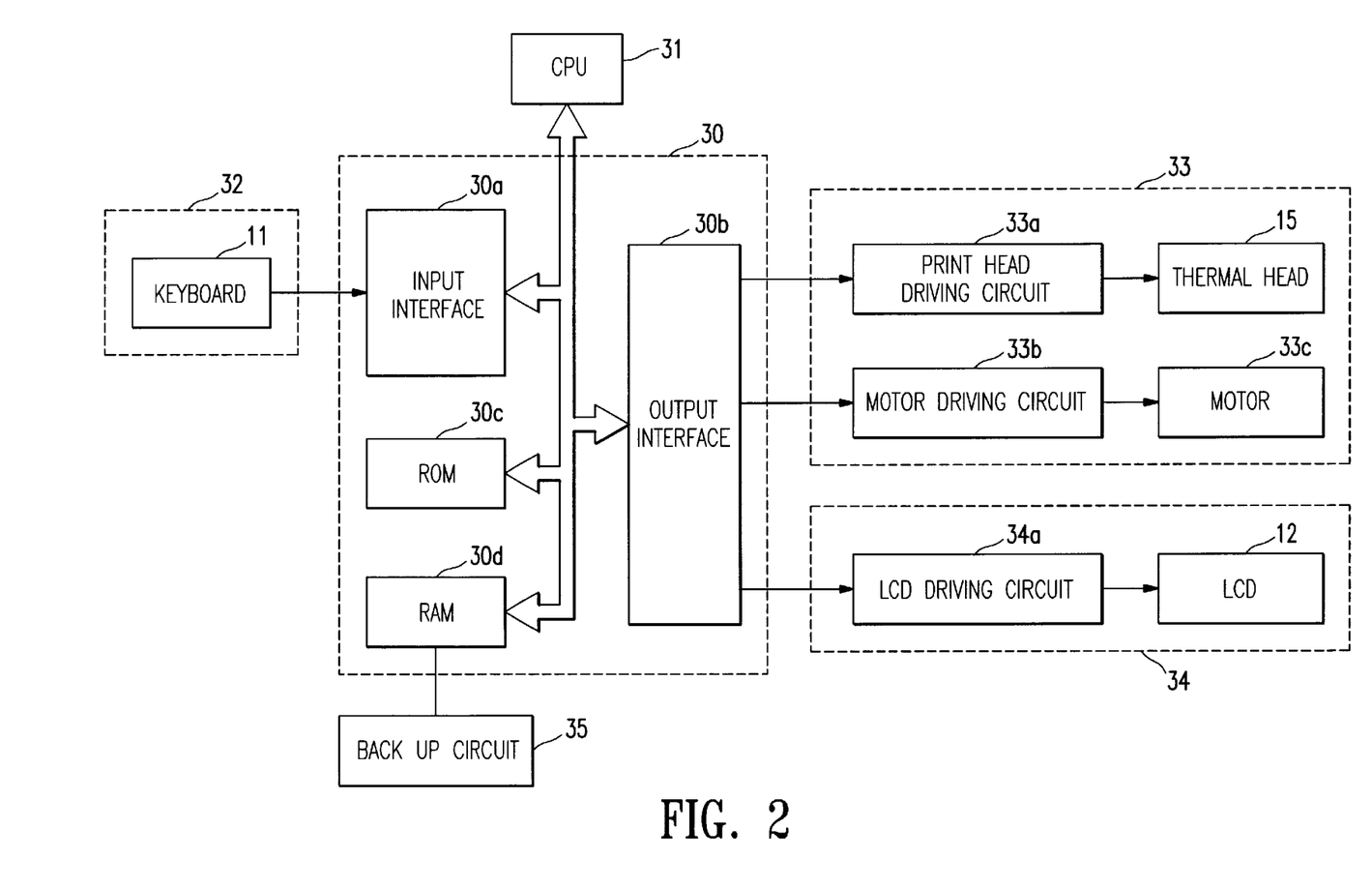
FIG. 2 is a block diagram which shows a control circuit of the tape printer shown in FIG. 1.

Referring to FIG. 2, an arrangement of the control system of the tape printer 1 of this embodiment is explained. A single-chip microcomputer 31 (hereinafter referred to as the CPU) is used for the control system. The control system is divided into four sections, a control section 30, an input section 32, printing section 33, and a display section 34 which are connected to the CPU.

The control section 30 includes programs for controlling the operation of CPU 31, a ROM 30c for storing font data, and a RAM 30d which stores the input data from the input section 32 as text image data. Power is supplied to the RAM 30d by a backup power supply circuit 35 which is independent of the power supplied to other electronic circuit parts so data can be stored in RAM even when the tape printer is powered down by an operation of the power supply key 11a. The information indicating what language messages are to be displayed in is stored in RAM 30d under the backup power supply. Included in the programs for controlling the tape printer 1 of this embodiment is a program which selects the language used for displaying messages. In addition, the ROM 30c has message tables for storing a plurality of messages expressed in at least two different languages and instructions on how to the address these messages as they are stored in memory. The control section also includes an input interface 30a and an output interface 30b through which data are exchanged between the input section 32, the printer section 33, and the display section 34.

The input section 32 comprises 63 keys with the keys being classified so as to clearly separate the character input keys from the keys which are operated to perform various functions. By operating the character keys, the characters to be printed are input and stored as text data. By operating the function keys, various functions such as setting the character attributes or editing text data may be performed.

The display section 34 comprises an LCD panel 12 for displaying information and an LCD drive circuit 34a which drives the LCD panel. In the display section 34, the text data stored in RAM 30d of the control unit 30 and other data is displayed. In the tape printer 1 of this embodiment, the display section 34 also acts as an operation guide display which displays warning messages, guidance messages, information regarding various system settings, and indications that unauthorized operations are being attempted.

The printer section 33 comprises a thermal head 15, a stepping motor 33c, and circuits 33a and 33b used to drive the thermal head and stepping motor. The printer section 35 prints on the printing tape 22 the data stored in RAM 30d of the control unit 30 according to the attributes set for the printing process.

Figure 3:
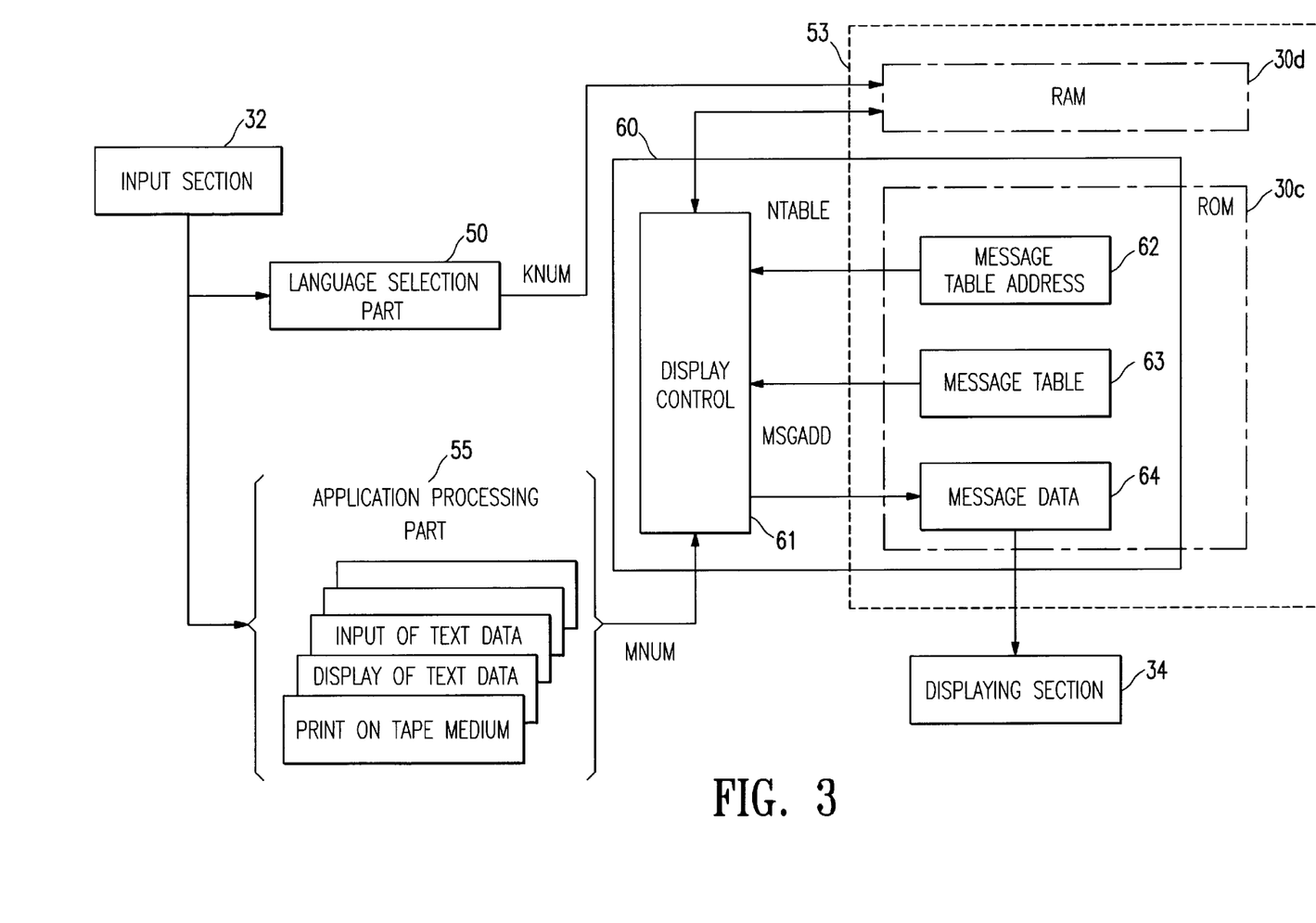
FIG. 3 is a block diagram which shows a processing system in the tape printer shown in FIG. 1.
Figure 4:
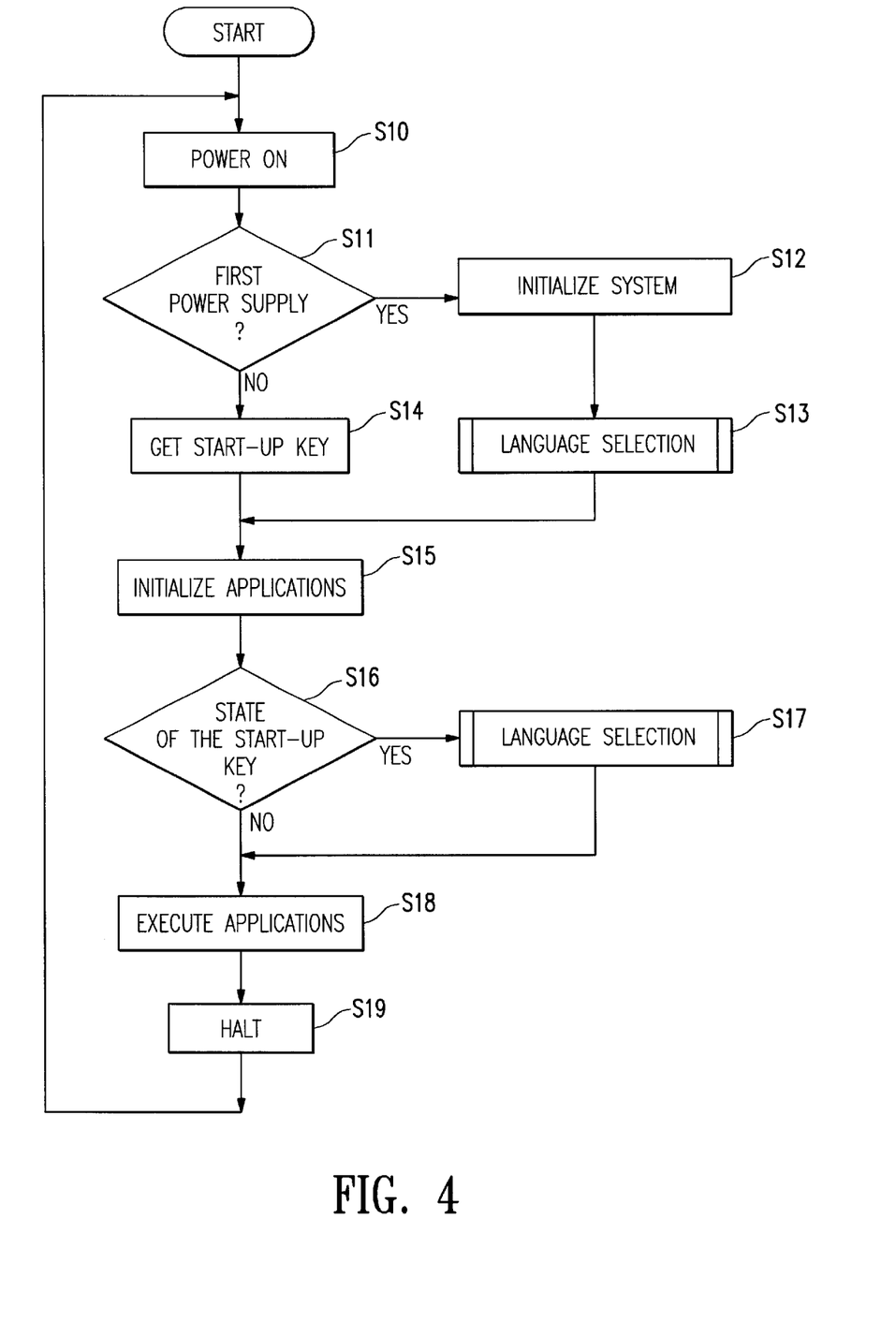
FIG. 4 is a flowchart which shows a process for selecting a language to be used for displaying messages on the tape printer shown in FIG. 1.
Figure 5:
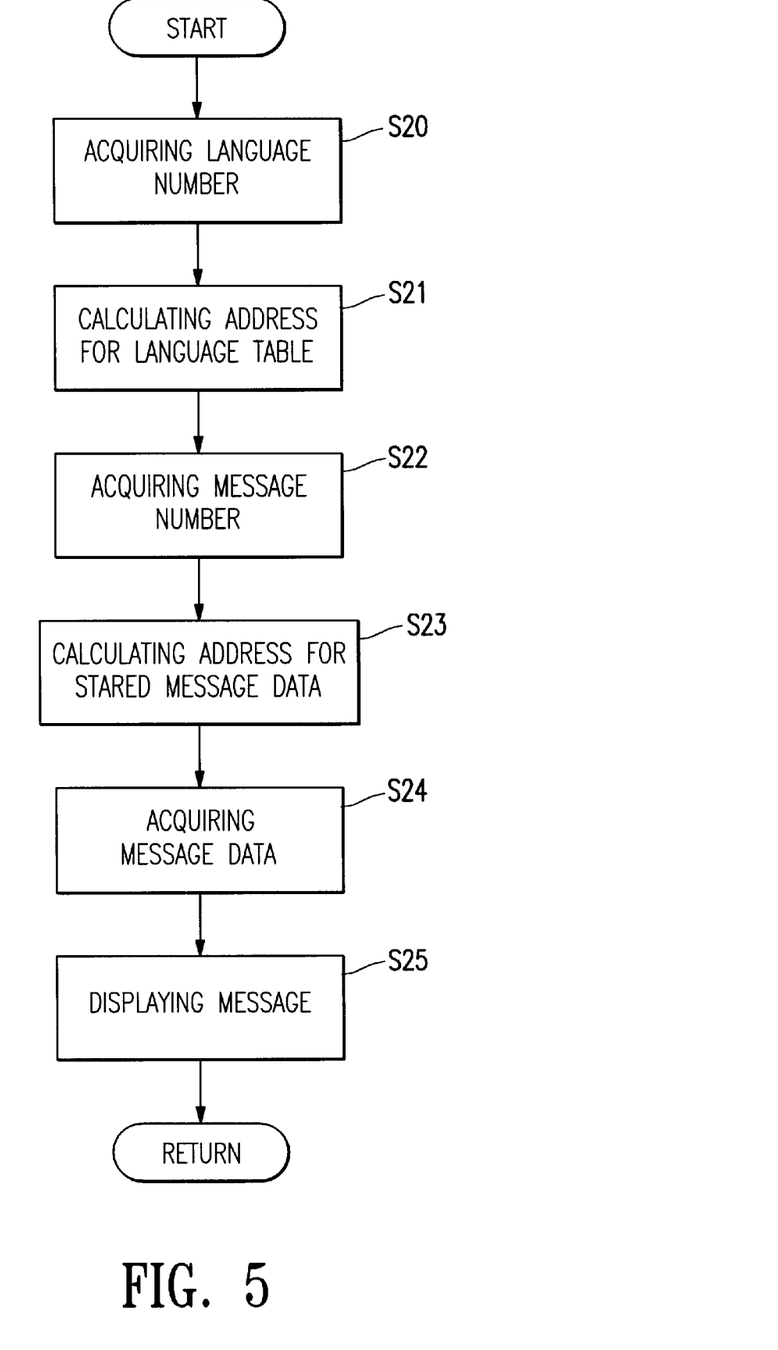
FIG. 5 is a flowchart which shows the process for displaying a message on the tape printer shown in FIG. 1.
Figure 6:
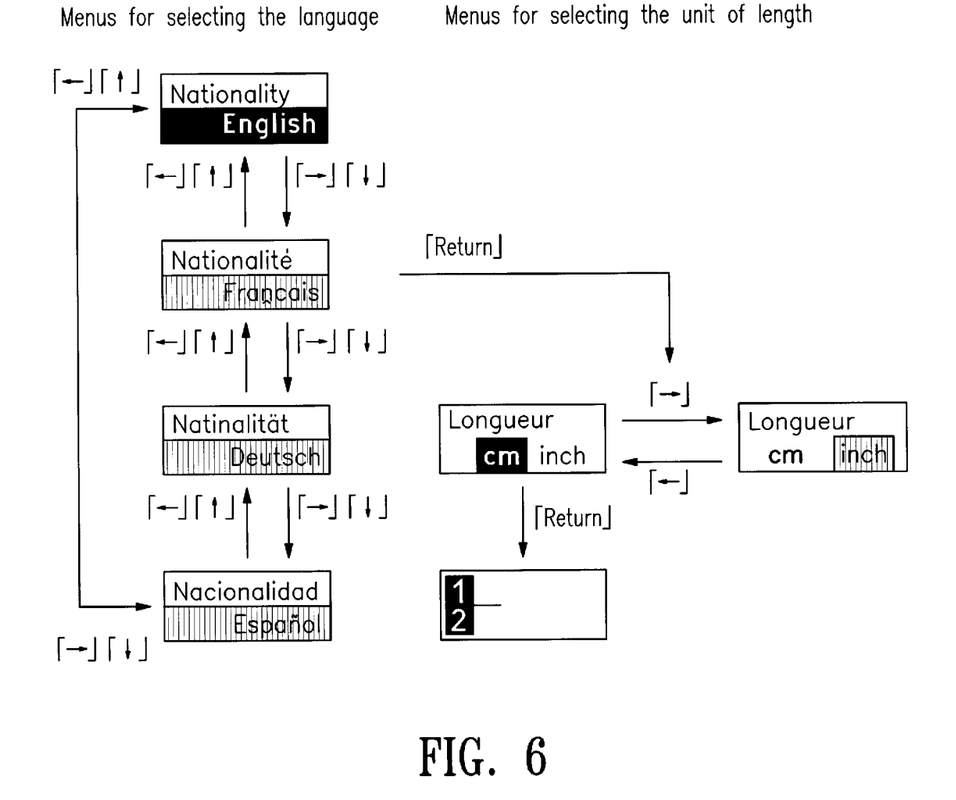
FIG. 6 shows the content of a menu which is displayed during the language selection process.
Figure 7A:
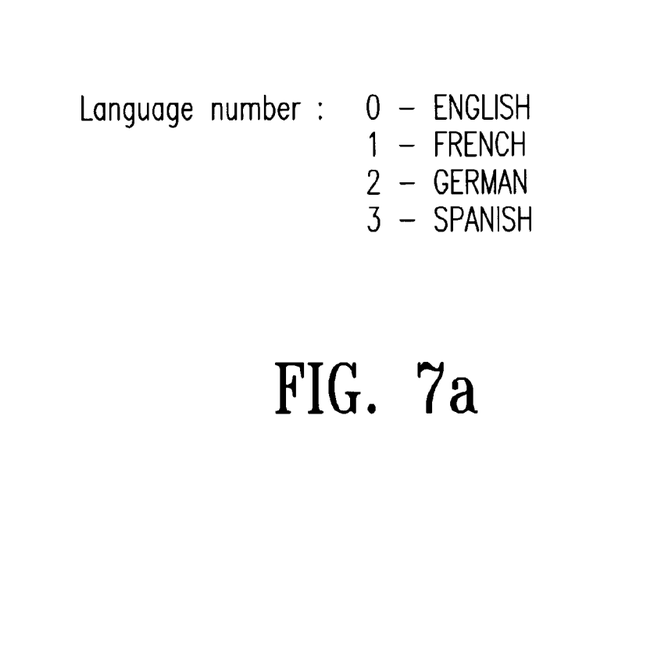
FIG. 7 shows an outline of various tables to be used for displaying messages in various languages.
Figure 7B:
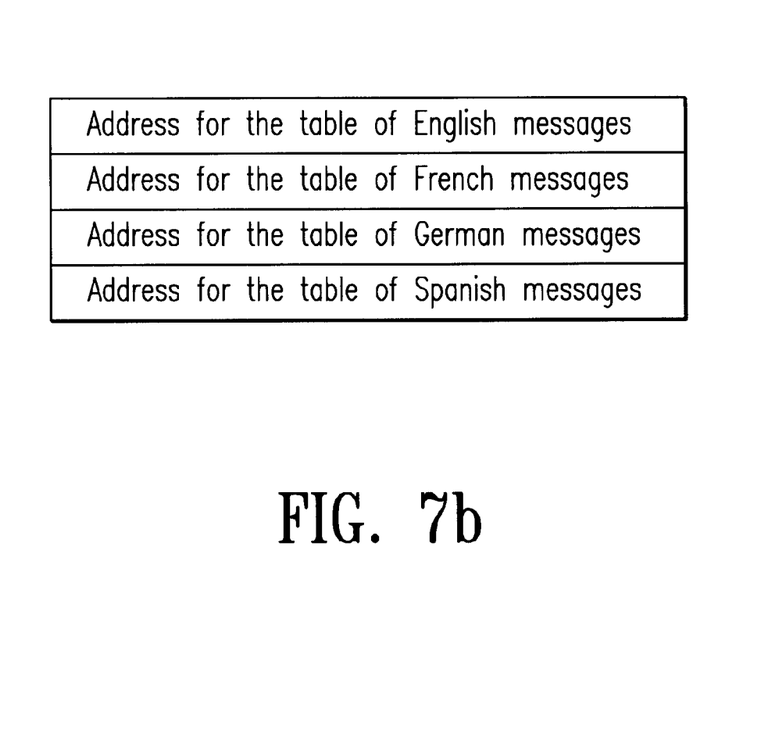
Figure 7C:
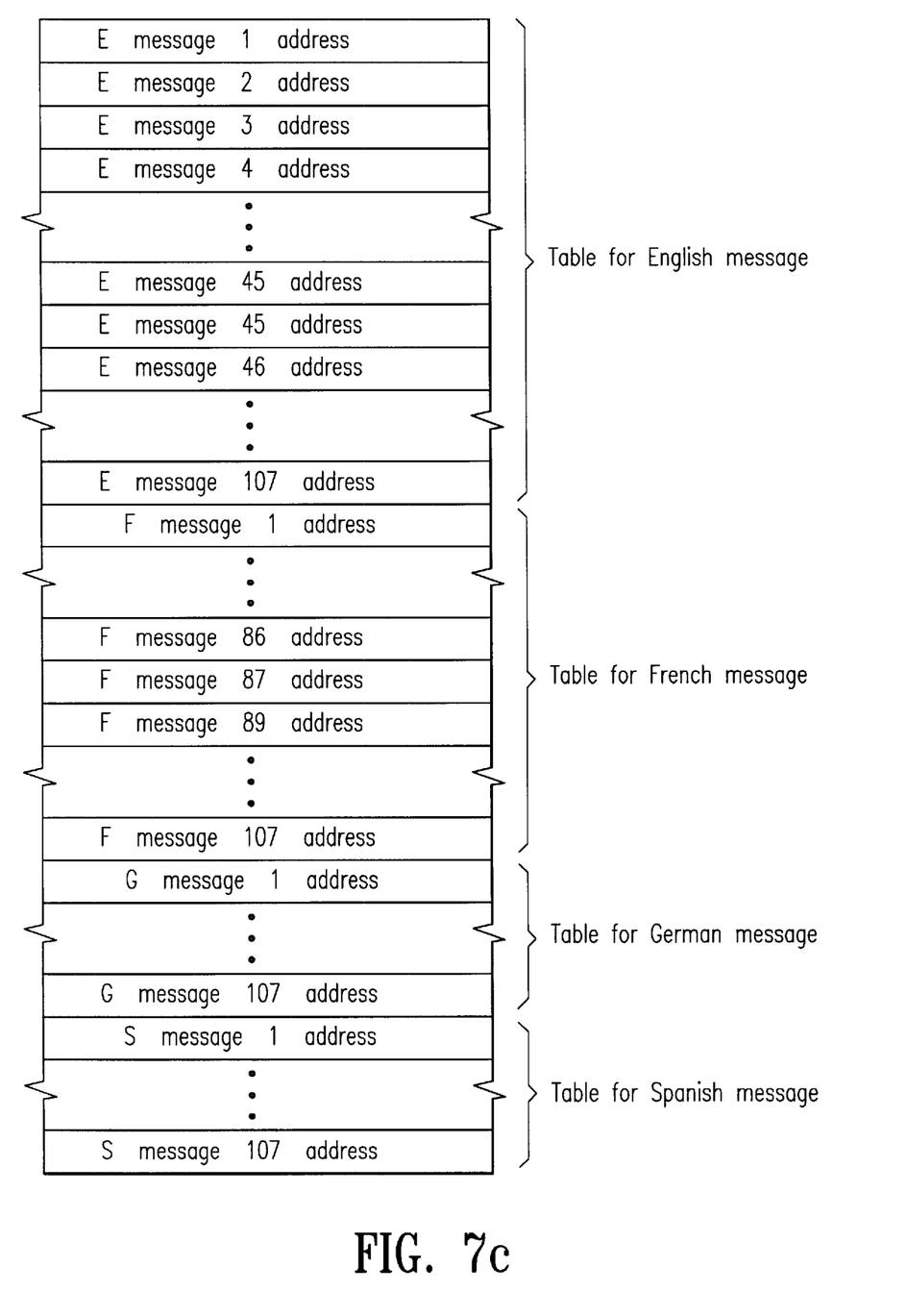

FIG. 3 depicts as a block diagram of the overall arrangement of the control system including a processing section for selecting the language used to display messages on the tape printer, and a processing section which displays the appropriate message in the selected language. An outline of each process is shown in FIG. 4 and FIG. 5 by the respective flowcharts. In FIG. 6, an example of the information presented by the display section during the language selection process is shown. In FIGS. 7 and 8, address tables used to store messages are shown and examples of various messages as expressed in two or more languages are provided.

The tape printer of this embodiment has a processing portion 50 of the control system for selecting the language in which the messages are to be displayed and a processing portion 55 of the control system for executing applications in which a series of processes such as text data entry, data display and printing are performed. The language selection part 50 becomes active according to the operation and/or the condition of the input section 32. The language selection part 50 becomes active under certain conditions as described below. The tape printer has a message display portion 60 of the control system which provides message data to the display section 34 to display messages during the language selection process and other applications. The message display part 60 selects a message expressed in the specified language and transfers the relating data to the message and its expression to the display section 34 so as to display the message on LCD 12 in the specified language.

In the tape printer 1 of the embodiment shown in FIG. 4, when the power supply is turned on for the first time, the process for selecting the display language is started. Users can therefore select the language easily, and problems such as the language being changed by misoperation can be prevented.

In the operation of this tape printer 1, when the power is turned on at the step S10, The control system of the tape printer determines if this is the first time the tape printer has been powered up. For instance if the power switch is activated immediately after batteries are installed, the tape printer will recognize the event as being a first-time power up operation. This determination is made at the step S11. When power is first applied to the tape printers operation unconditionally proceeds to the step S13 after basic systems initialization is performed in step S12. In the step S13, the language selection portion 50 (FIG. 3) of the processing system becomes active.

In step S13 shown in FIG. 4, a program used for the language selection is loaded from memory and started by the controlling CPU 31. Control methods are of course not limited to the above programming and storage methods. For example, a microprogram method and/or a hard wiring logic method can also be employed. In the step S13, the tape printer will be controlled by the microprogram memory if a microprogram method is employed, and the tape printer will be controlled by the logic circuit if a hard wired logic method is employed.

When the language selection processing 50 of the control system starts, one of the images shown in FIG. 6 appears on the LCD 12. In each image shown in FIG. 6, the menu is presented such that the first line of the display contains the word "Nationality" as it appears in a particular language. The second line displays the actual language itself. The interface is designed such that the user only has to operate an arrow key 11e of the input section 32 to select the desired language which will be used for displaying messages. During a repeated operation of the arrow key 11e, the display will cycle through the available languages. Once the arrow key 11e has been operated so as to display the desired language on the LCD display 12, the language selection is completed by pushing the "Return" key 11f of the input section 32, thereby selecting the displayed language. In this operation, a number KNUM allocated to the selected language is acquired on the control side and is preserved in the RAM 30d of the storage section 53.

In the tape printer of this embodiment, in the step S13 for selecting the language, it is also possible to select the units used for indicating the tape length. For such an operation, the language selection menu shown in FIG. 6 is organized in a hierarchical structure. Therefore, after the language is selected and set, the units used to indicate the length of the printing tape on which the characters are printed may be switched using a menu-driven process similar to the process used to select the language. Units of the length is merely an example which illustrates that the hierarchical menu structure can be used to select a desired parameter or option. The menu system may be easily adapted to incorporate other functions into the displayed menu system, such as the ability to choose a special dictionary for spell checking or the ability to change the font of the displayed characters. The above-mentioned items usually vary between different linguistic regions, and it is therefore convenient that these items can be changed together with the language. The described processes for selecting the display language and other items allow the user to easily construct an individualized operating environment. Moreover, since the number of steps required to effect the above described changes is kept to a minimum, users can efficiently operate the system with a minimum amount of error. Also, the user can readily ascertain whether or not particular languages or units are available without consulting the manuals.

After the language and other additional options have been selected according to the above-described process, the LCD 12 returns to a usual image condition, and the operation proceeds to the step SIS during which applications are initialized. On the other hand, if the tape printer determines at the step S11 that power is not being applied to the tape printer for the first time, the control system acquires the key status pushed by the user during power-up in step S14. In this embodiment, if the user would like to change the language using for the message expression during a power-up sequence other than the initial power-up sequence, the user can push the power supply key 11a together with "Function" key 11c and "N" key 11d of the input section 32 at the time that power is turned on. When power is turned on, the status of these keys is stored in the RAM 30d, and this status is acquired in the step S14.

During execution of step S15, various processing components included in the tape printer and used by various applications are initialized. After the initialization, the state of the start-up key acquired in step S14 is distinguished in step S16. If the "Function" and "N" keys were pressed during the power-up sequence, the operation proceeds to step S17 in which the language selection processing 50 becomes active and the language selection process starts as in step S13. After the language is selected, the operation proceeds to the step S18 where various applications may be executed. If the "Function" and "N" keys were not pressed during the power-up sequence, the operation proceeds directly to the step S18 without performing the language selection process, and the various applications such as displaying the text data, editing or printing characters may be started.

When certain applications are executed to completion in the present tape printer, the power supply is turned off by the user in the step S19, and the tape printer enters a halted condition in which the CPU is suspended and will not work. In the case that the language is selected and set at the first power-on, the power supply is turned off, and then the power is turned on for a second time, the operation does not proceed to the step S12 but rather the initialization is immediately performed at the step S15. In such a situation, the user can start the language selection process by pushing the "Function" and "N" keys when the power is turned on. When user does not push these keys, the various applications become ready immediately and the language selection process is not performed.

With reference to the flowchart shown in FIG. 5, the operations in the message display portion 60 of the processing system will now be explained. In the tape printer of this embodiment, during the processes for setting the various functions and/or when an error has occurred, messages are displayed on the display section 34 to facilitate the operation of the tape printer. The processes for displaying messages are controlled by the message display portion 60 of the processing system. The message display portion 60 of the processing system includes message data 64 for storing the messages expressed in each language, message tables 63 for storing the address (MSG) of each message in the message data 64, and message table addresses 62 for storing the leading address (NTABLE) of each message table 63 prepared corresponding to the available languages. These tables 62, 63 and 64 are stored in the ROM 30c of the storage section 53. The message display portion 60 of the processing system also has a display control unit 61 for calculating the address of the message to be displayed, This calculation is performed using a message number MNUM acquired from the application and the language number KNUM which was assigned in the language selection portion 50 of the processing system. The display control unit 61 transfers the calculated address to the display section 34. The tables 62, 63 and 64 are shown in FIG. 7 Examples of display messages in several languages are shown in FIG. 8, In the message display part 604 the language number KNUM stored in RAM 30d from the language selection part 50 is acquired during the step S20. Then, during the step S21, the leading address NTABLE of the desired message table 63 is calculated using the language number KNUM as follows.

$$NTABLE \Leftarrow (KNUM*2)+ADTBL \quad (1)$$

wherein, KNUM is the language number, ADTBL is the most leading address of the message table addresses 62 shown in FIG. 7b, and "<=" indicates that the address ((KNUM*2)+ADTBL) will be set as the value of NTABLE. The value set as NTABLE in step S21 is the leading address of the message table with the selected language as calculated and selected from all the available message tables 63 shown in FIG. 7c. This value of NTABLE is temporarily stored in the RAM 30d to be used in later steps.

Then, at step S22, a value of the message n umber MNUM, which is a number having a minimum value of 0 and which identifies the message to be displayed in the display section, is acquired from the active application or from the language selection part if it is active. In the step S23, an address MSG of message data 64, at which location the actual message to be displayed is stored, is calculated by the address value NTABLE as follows, where the notation used is consistent with the previously described calculation.

$$MSG \Leftarrow (MNUM*2)+NTABLE \quad (2)$$

Figure 7D:
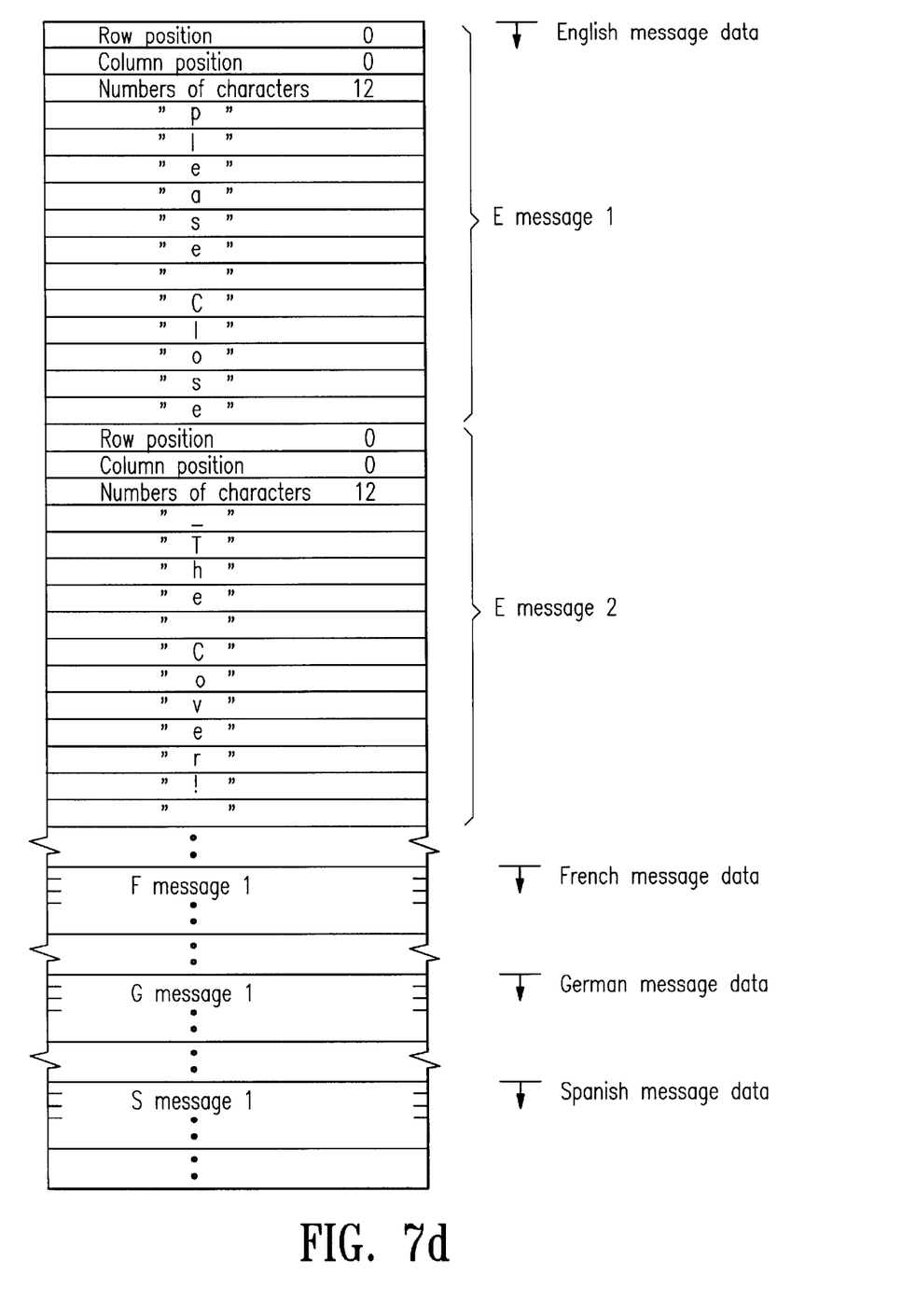
Figure 8:
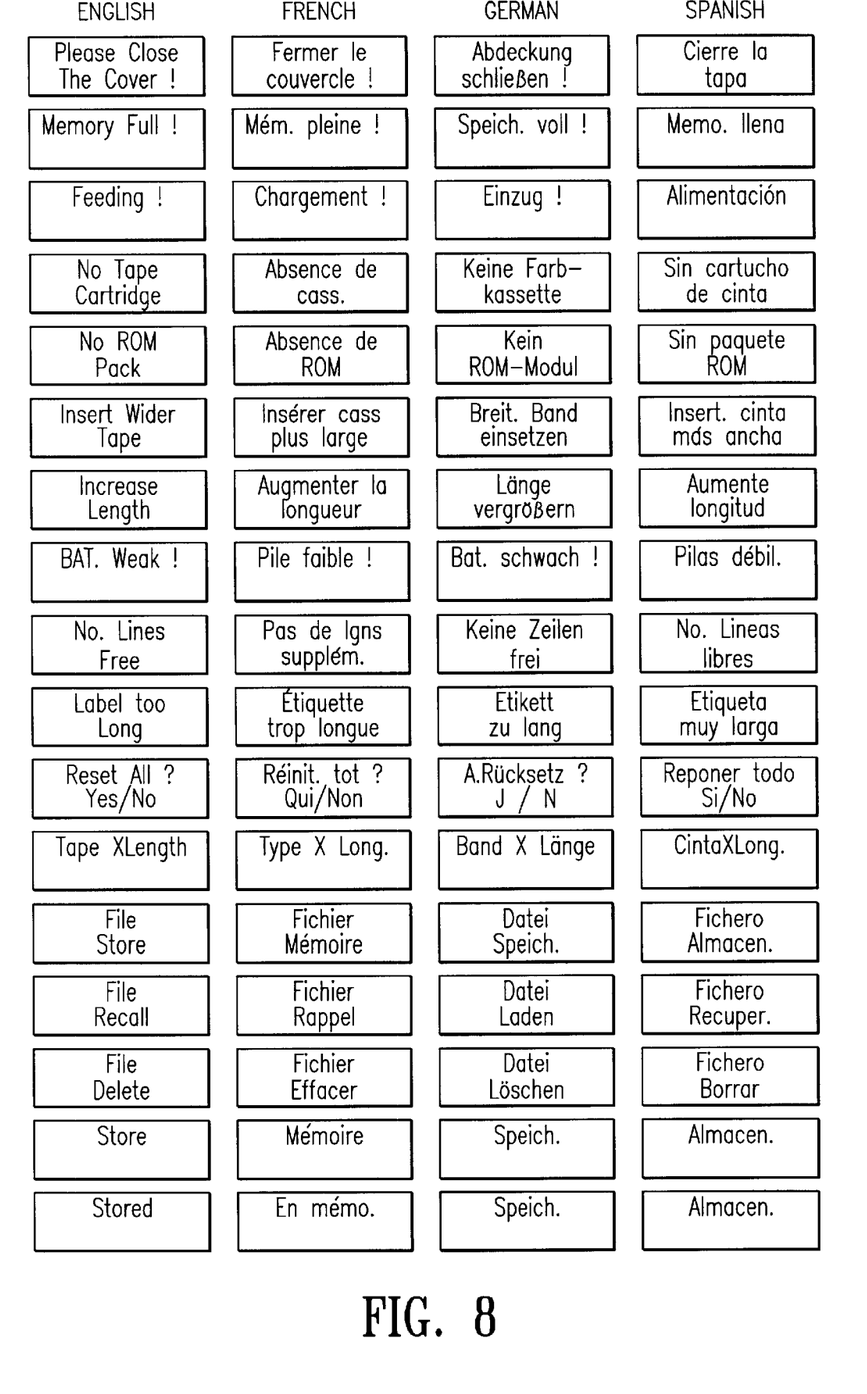
FIG. 8 depicts an example of some messages which may be displayed on the tape printer.

In the step S24, as is shown in FIG. 7d, the tape printer retrieves a row number, column number and the number of characters to be included in the message from the memory address MSG of the message data 64 in addition to the actual stored message.

Finally, at step 25, signals generated from the message data are sent to the LCD driver circuit 34a in the display section 34, and the message is displayed in the selected language on the LCD panel 12, thereby completing the series of processes which display messages in the display section 34 of the tape printer.

As described above, in the tape printer of this embodiment, the language used for displaying messages can be selected by the language selection portion 50 of the processing system. By combining the language selection functions with the message display portion 60 of the processing system, it becomes possible to express various system messages in a specified language selected from a plurality of languages provided in the tape printer. Although the tape printer may have many available languages, once the user's desired language is set, the messages will continue to be displayed in that same language until the user decides to change the language. Changing of the language cannot be accomplished inadvertently during normal operations nor during the usual power-on operation.

The above-mentioned methods for storing message data and for acquiring the address which contain the message to be displayed are illustrative examples and it should be noted that the scope of the invention is not limited to these described methods.

Figure 9:
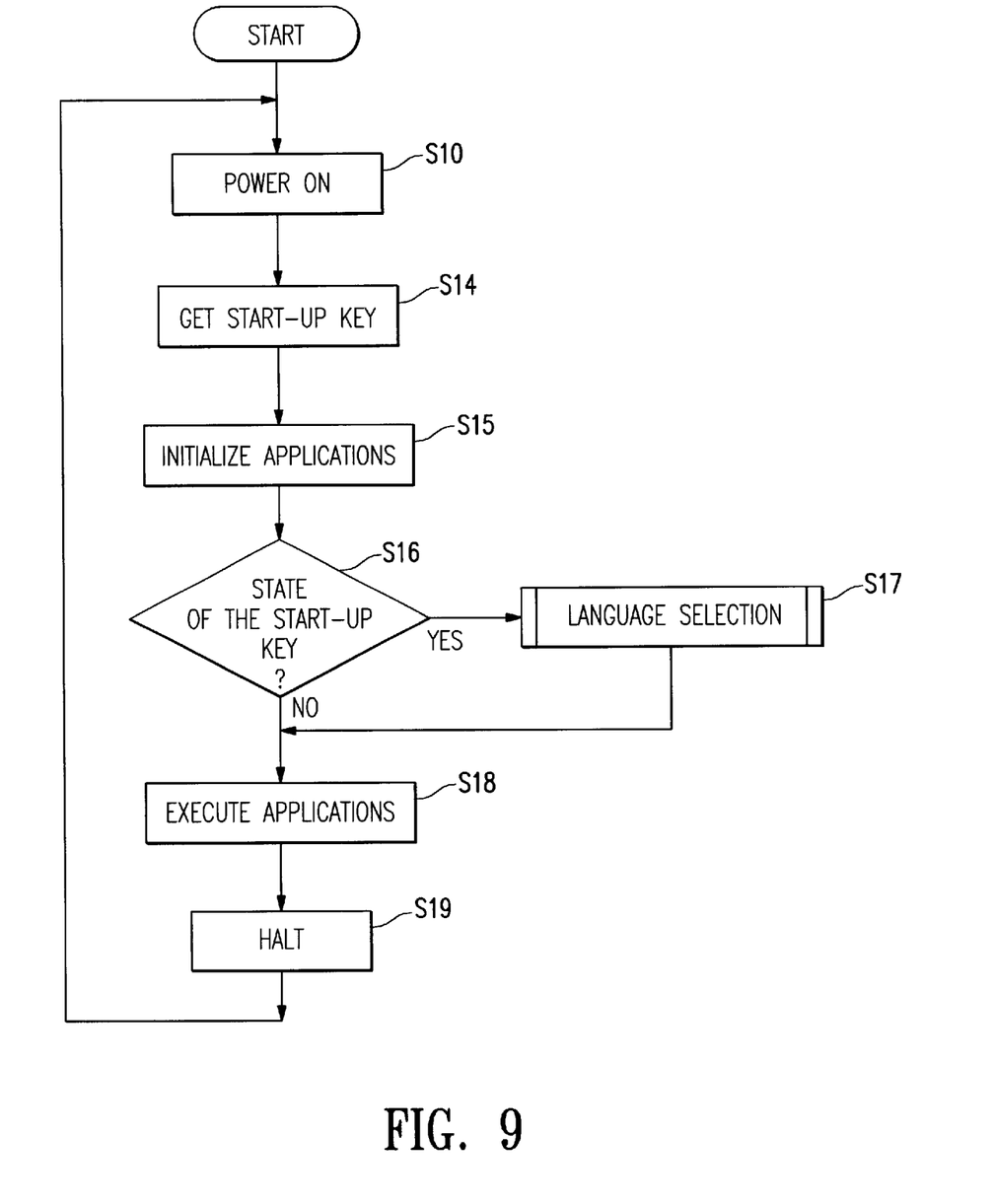
FIG. 9 is a flowchart which represents, for a different embodiment of this invention, a different method for starting the language selection process.
Figure 10:
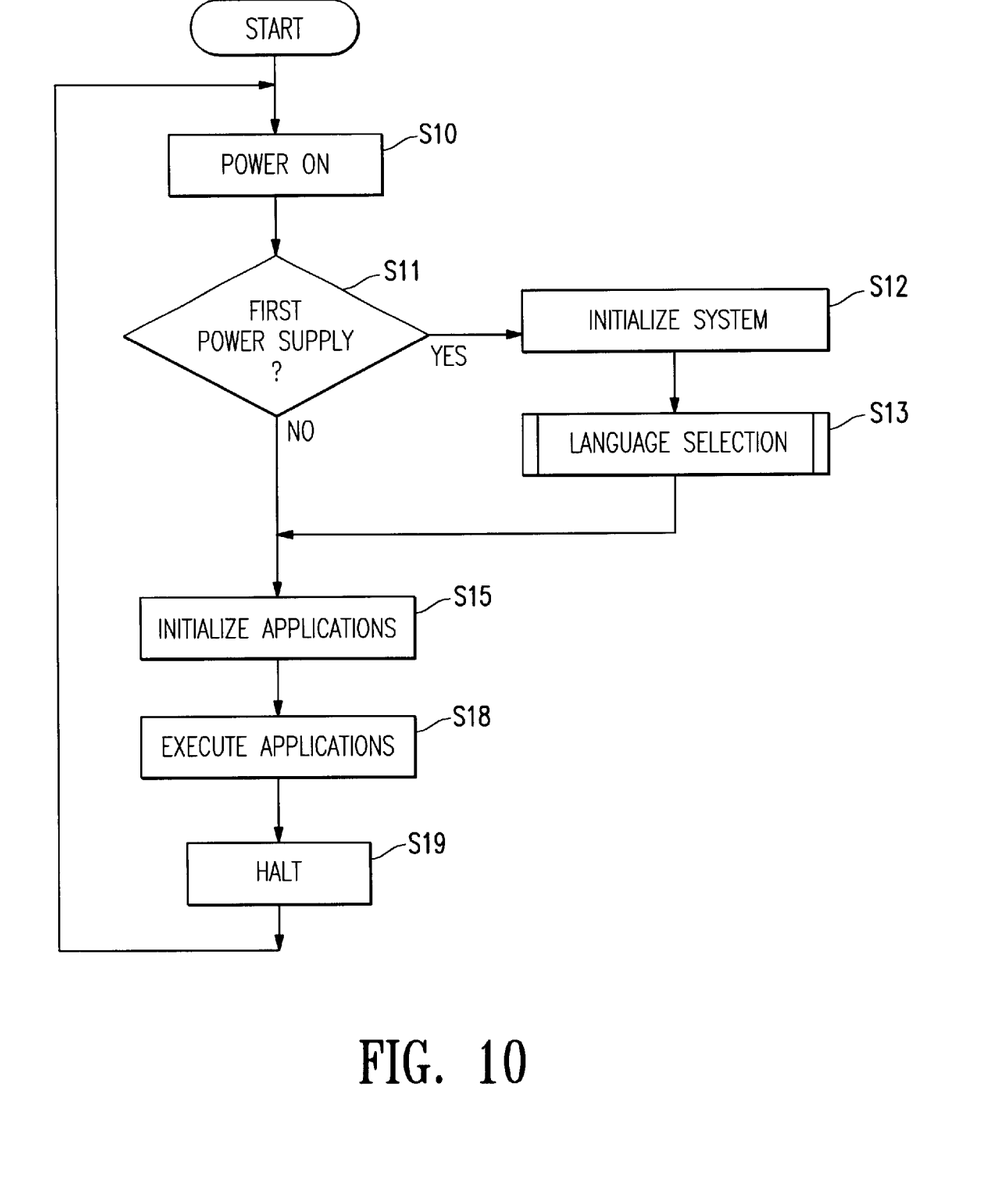
FIG. 10 is a flowchart which represents, for a different embodiment of this invention, yet another different method for starting the language selection process.
Figure 11:
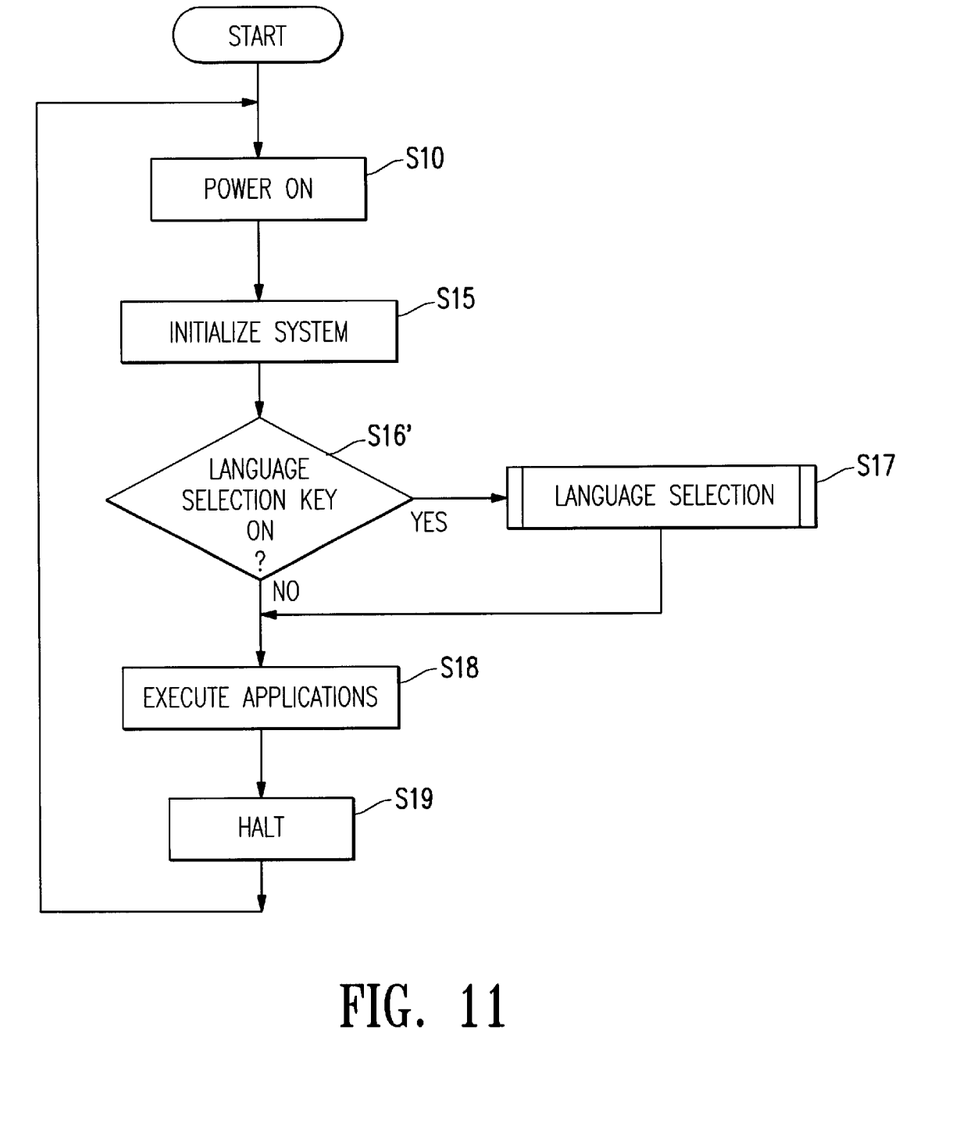
FIG. 11 is a flowchart which represents, for a different embodiment of this invention, a third different method for starting the language selection process.
Figure 12:
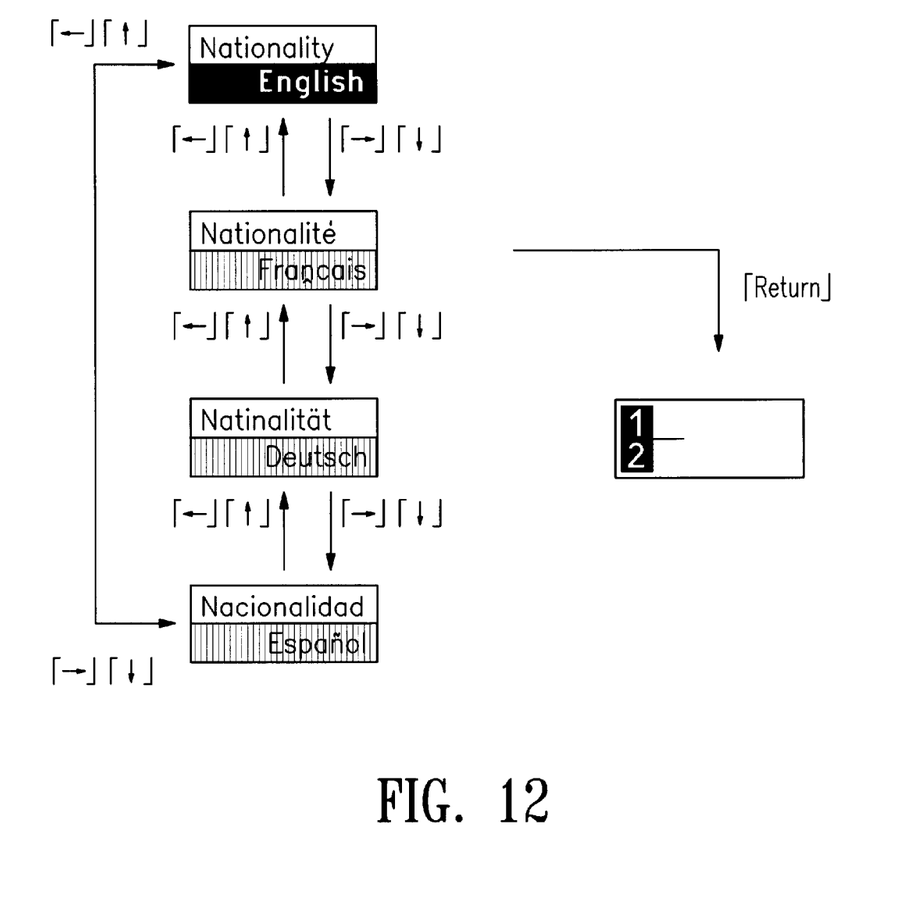
FIG. 12 shows another example of the menu to be displayed during the language selection process.

In addition, the steps of the starting process for the language selection part are not limited to the above-mentioned processes. For instance, the language selection process may be started every time the system acquires a start key, as shown in FIG. 9, without regard for whether or not the power is being applied for the first time. With regard to acquiring the start key and starting the language selection process, the combination of the power supply key with the "Function" key and the "N" key is also an illustrative example of this embodiment, and the present invention is not limited to this combination of start keys. In addition, as is shown in FIG. 10, the present invention may be configured such that language selection processing may be started only at the time when the tape printer is first turned on. Another approach is presented in FIG. 11, where a key specifically used for starting the language selection part is arranged in the input section such that the language selection processing starts whenever the particular key is operated. In the present embodiment, the unit of the length must be selected during the process of selecting the language. However, it may also be possible to prepare a menu which is used only to select the language. In another embodiment shown in FIG. 12, the image displayed on the panel changes to the usual state for executing the applications soon after the language selection process ends.

As explained above, the tape printer of this invention can select the language used to display messages such that one tape printer can provide system messages and other information in any one of several languages and can therefore be marketed and sold in different linguistic regions. This flexible design eliminates the need to develop, manufacture and sell several different tape printers, one for each different linguistic areas and countries. This flexible design therefore leads to significant savings in the time, cost and labor that would otherwise be required to develop, manufacture and sell tape printers designed for specific languages. It therefore becomes possible to provide the tape printer of the present-invention at a low price such that more users are able to afford such a tape printer. A further benefit for the users is that they are able to construct an operations environment that is convenient for them regardless of where the tape printer is purchased. For example, a tape printer according to the present invention could be purchased in Japan and be easily configured to operate in English. Since systems settings and operations guidance messages are provided in a comprehensible language, users can operate and set the various functions of the tape printer according to the messages displayed thereon without referring to the instruction manuals.

In the tape printer of this invention, since the language is only selected under particular conditions such as at the time that the power is turned on, the users are prevented from changing the selected language during normal operation. On the other hand, in the tape printer of this invention, the option to reselect the language is always available such that users can select a convenient language easily. Moreover, since the reselection of the language is performed by operating the power-on key with a specific combination of other keys, the possibility that the user will accidentally change the language is very small. When the menu for selecting the language is automatically presented at the first power on operation, the user can select the desired language promptly and adequately without referring to the instruction manuals. By adding the above steps on the operation of the tape printer, the user can use the tape printer more conveniently. On the other hand, since the menu for selecting the language appears automatically only once at the time when the power is initially turned on, unexpected changes of language under the usual operating condition can be prevented. A key exclusively used to choose the language may also be arranged on the tape printer for selecting the display language freely. Such tape printers are convenient if they are to be shared by multiple users.

In addition, some peculiar functions relating to cultural differences such as the unit used to express length can be changed using the same process for selecting the language. Therefore, in accordance with the present invention, convenient, low cost tape printers can be provided which are easily adapted by users of different cultures to suit their individual needs.

What is claimed is:

1. A tape printer for printing on a tape medium, comprising:
   input means for entering data to be printed, said unput means including a plurality of keys;
   memory means for storing said data and system settings of said tape printer;
   display means for displaying said data entered by said input means and information regarding said system settings;
   language selection means for selecting a language to be used for displaying messages on said display means;
   tape cartridge storage means for accommodating a tape cartridge including said tape medium;
   wherein said language selection means is automatically started at a time when power is first supplied to the tape printer and is selectively initiated by a combined operation of a power supply key with at least one of said plurality of keys arranged on said input means.

2. The tape printer of claim 1, wherein said language selection means can be used to change at least one of other selected items using the same process which is used for selecting a language.

3. A tape printer for printing information onto a tape medium, said printer comprising:
   input means for entering data to be printed, said input means including a plurality of keys;
   a display;
   tape cartridge storage means for accommodating a tape cartridge including said tape medium;
   a memory containing a plurality of messages, a first set of messages being in a first language, a second set of messages being in a second language;
   language selection means, accessible by a user, for selecting a given language and generating a first digitally coded number;
   means for storing the first digitally coded number;
   means for generating a message number desired to be illustrated on the display;
   address selection means, using a function of the combination of the first digitally coded number and the message number to generate an address for fetching the desired message in the selected language from the memory for illustration on the display; and
   wherein said language selection means is automatically started at a time when power is first supplied to the tape printer and is selectively initiated by a combined operation of a power supply key with at least one of said plurality of keys arranged on said input means.

4. The printer of claim 3 which further comprises:
   means for displaying a menu of language choices upon said language selection means being started and initiated; and
   said input means being employed by the user to select the given language from the menu for generating said first digitally coded number.

* * * * *